(12) United States Patent
Hoshika et al.

(10) Patent No.: US 10,519,891 B2
(45) Date of Patent: Dec. 31, 2019

(54) CONTROL DEVICE FOR INTERNAL COMBUSTION ENGINE

(71) Applicant: HITACHI AUTOMOTIVE SYSTEMS, LTD., Ibaraki (JP)

(72) Inventors: Hiroaki Hoshika, Hitachinaka (JP); Takeo Hosokawa, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 15/771,335

(22) PCT Filed: Oct. 5, 2016

(86) PCT No.: PCT/JP2016/079561
§ 371 (c)(1),
(2) Date: Apr. 26, 2018

(87) PCT Pub. No.: WO2017/073273
PCT Pub. Date: May 4, 2017

(65) Prior Publication Data
US 2018/0328302 A1    Nov. 15, 2018

(30) Foreign Application Priority Data

Oct. 28, 2015   (JP) .................................. 2015-211400

(51) Int. Cl.
*F02D 41/22*     (2006.01)
*F02M 26/42*    (2016.01)
(Continued)

(52) U.S. Cl.
CPC ............ *F02D 41/222* (2013.01); *F02B 37/00* (2013.01); *F02D 41/144* (2013.01);
(Continued)

(58) Field of Classification Search
CPC .. F02D 41/222; F02D 41/144; F02D 41/2432; F02D 41/2451; F02B 37/00;
(Continued)

(56) References Cited

U.S. PATENT DOCUMENTS 9,513,245 B2    12/2016  Sakai et al.
9,970,396 B2 *   5/2018  Hoshika ............... G01N 27/223
(Continued)

FOREIGN PATENT DOCUMENTS

JP    58-119955 A    7/1983
JP    59-165937 U    11/1984
(Continued)

OTHER PUBLICATIONS

International Search Report for WO 2017/073273 A1, dated Dec. 27, 2016.
(Continued)

*Primary Examiner* — Syed O Hasan
(74) *Attorney, Agent, or Firm* — Volpe and Koenig, P.C.

(57) ABSTRACT

In order to provide a highly precise and highly responsive humidity detection means with which diagnosis is easy, this control device for an internal combustion engine is characterized in that two or more sensors for detecting the humidity of the atmosphere or a gas mixed with the atmosphere are provided in the middle of the flow in an intake air passage of the internal combustion engine, at least one of these sensors being a relative humidity sensor for detecting the relative humidity, at least one other of the sensors being an absolute humidity sensor for detecting the absolute humidity, and the relative humidity sensor being arranged upstream from the absolute humidity sensor.

7 Claims, 11 Drawing Sheets

(51) Int. Cl.
*F02D 41/24* (2006.01)
*F02D 41/14* (2006.01)
*F02M 26/46* (2016.01)
*F02M 35/10* (2006.01)
*F02B 37/00* (2006.01)

(52) U.S. Cl.
CPC ..... *F02D 41/2432* (2013.01); *F02D 41/2451* (2013.01); *F02M 26/46* (2016.02); *F02M 35/10157* (2013.01); *F02M 35/10249* (2013.01); *F02M 35/10373* (2013.01); *F02M 35/10393* (2013.01); *F02D 2200/0418* (2013.01)

(58) Field of Classification Search
CPC ............. F02M 35/10; F02M 35/10157; F02M 35/10373
See application file for complete search history.

(56) References Cited

U.S. PATENT DOCUMENTS

| | | | |
|---|---|---|---|
| 2002/0078916 A1 | 6/2002 | Altmann et al. | |
| 2005/0072404 A1* | 4/2005 | Cullen | F02D 41/1475 123/399 |
| 2007/0095328 A1* | 5/2007 | Brehob | F02D 41/005 123/406.47 |
| 2007/0157901 A1* | 7/2007 | Caine | F01L 1/25 123/302 |
| 2013/0087127 A1* | 4/2013 | Piper | F02B 37/004 123/568.12 |
| 2016/0202200 A1 | 7/2016 | Nakano et al. | |

FOREIGN PATENT DOCUMENTS

| | | |
|---|---|---|
| JP | 2002-195114 A | 7/2002 |
| JP | 2004-360495 A | 12/2004 |
| JP | 5516505 B | 6/2014 |
| JP | 5628236 B | 11/2014 |
| JP | 2015-045515 A | 3/2015 |
| WO | 2015/087644 A1 | 6/2015 |

OTHER PUBLICATIONS

Japanese Office Action dated Dec. 18, 2018 for the Japanese Patent Application No. 2017-547699.

* cited by examiner

CROSS SECTION A-A

CHARACTERISTIC CHART OF ABSOLUTE HUMIDITY SENSOR

CHARACTERISTIC CHART OF RELATIVE HUMIDITY SENSOR

[Fig. 7b]

CHARACTERISTIC CHART OF TEMPERATURE SENSOR

[Fig. 8]

RESPONSE CHARACTERISTICS OF TEMPERATURE AND HUMIDITY SENSORS

CONTROL DEVICE FOR INTERNAL COMBUSTION ENGINE

TECHNICAL FIELD

The present invention relates to a measurement device suitable for measuring the humidity of intake air in an internal combustion engine.

BACKGROUND ART

A method for attaching a humidity measurement sensor to an intake part of an internal combustion engine and controlling the internal combustion engine by processing the information with an electronically controlled control device is in wide use as an exhaust gas and fuel economy improvement. In addition, there are various principles regarding air humidity measurement methods, and examples thereof include a thermal humidity sensor using heat radiation as in PTL 1 and a relative humidity sensor disclosed in PTL 2 in which a dielectric constant changes as a result of moisture infiltration into a polymer and it is measured as capacitance.

Grasping the absolute amount of moisture, that is, an absolute humidity is important in controlling the internal combustion engine. The thermal humidity sensor directly measures the absolute humidity. In a case where the relative humidity sensor is used, however, the absolute humidity is calculated from a relative humidity and the temperature of that place. In addition, various methods have been devised as in PTL 3 and PTL 4 with regard to where the humidity sensor is to be attached in the internal combustion engine.

CITATION LIST

Patent Literature

PTL 1: Japanese Patent No. 5628236
PTL 2: Japanese Patent No. 5516505
PTL 3: JP-A-2002-195114
PTL 4: JP-A-2004-360495

SUMMARY OF INVENTION

Technical Problem

The measurement environment of the humidity sensor used in an intake air path in the internal combustion engine shows more diverse changes than in a case where the temperature and humidity of an atmospheric environment are measured. In addition, a humidity measurement place may be disposed in a plurality of places instead of a single place in some cases. In an engine equipped with a supercharger, for example, condensation occurs in an intercooler cooling air reaching a high temperature by being compressed, moisture is turned from water vapor into droplets of water, and then the absolute humidity changes and the temperature and pressure of intake air behind the supercharger suddenly changes as well. Furthermore, in an EGR-equipped engine, the moisture that is contained in exhaust gas is merged with intake air and suddenly changes as well. Moreover, these occur complexly in many cases.

In a case where the humidity of the atmosphere is measured, both the pressure and the temperature show no sudden change, and thus a slow-response, yet high-accuracy capacitive relative humidity sensor, is widely used. However, when the sensor is used downstream of a supercharger and after EGR gas mixing, accurate absolute humidity calculation is impossible due to insufficient responsiveness. The thermal humidity sensor, in the meantime, measures a heat radiation phenomenon in a very small space and is excellent in terms of responsiveness because of the absence of temperature dependence of the sensor. Still, a resistor is subjected to a high-temperature operation in the thermal humidity sensor, and thus the thermal humidity sensor has a risk in terms of characteristics changing little by little. Furthermore, the use of a single humidity sensor causes a problem by lacking means for determining a decline in humidity measurement accuracy.

An object of the present invention is to provide high-accuracy and high-response humidity measurement means facilitating diagnosis and solving those problems.

Solution to Problem

In order to solve the above problems, the configuration that is described in, for example, the claims is adopted.

As an example, at least two sensors measuring a humidity of an atmosphere or gas mixed with the atmosphere are provided in a middle of a flow of an intake passage of an internal combustion engine, at least one of the sensors being a sensor measuring a relative humidity, the other sensor being a sensor measuring an absolute humidity, and the sensor measuring the relative humidity being disposed upstream in the flow.

Advantageous Effects of Invention

According to the present invention, high-accuracy and high-response humidity measurement means facilitating diagnosis can be provided. Objects, configurations, and effects other than the above will be made apparent in the following description of an embodiment.

BRIEF DESCRIPTION OF DRAWINGS

FIG. 3 is a diagram illustrating a configuration of a thermal absolute humidity sensor.

FIG. 6 is a diagram illustrating a configuration of a capacitive relative humidity sensor. Fig. 6a shows an overview of a capacitive relative humidity sensor. Fig, 6b shows a sign of a comb-shaped electrode portion from Fig. 6a.

FIG. 7 is a diagram illustrating the characteristics of the capacitive relative humidity sensor and a temperature sensor thereof.

FIG. 9 is a diagram illustrating a mixing ratio and the temperature and humidity of air of a first humidity sensor portion during traveling of a vehicle.

FIG. 10 is a diagram illustrating a mixing ratio and the temperature and humidity of air of a second humidity sensor portion during the traveling of the vehicle.

DESCRIPTION OF EMBODIMENTS

Figure 1:
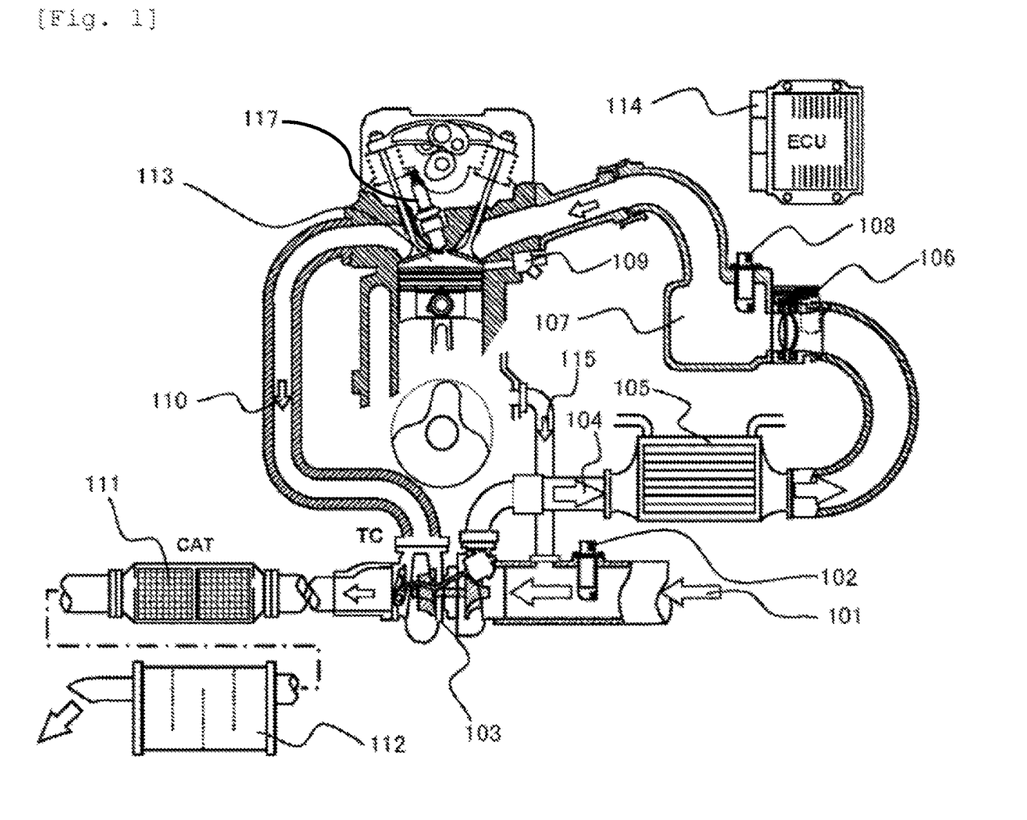
FIG. 1 is a diagram illustrating a configuration of an internal combustion engine.

Hereinafter, an embodiment of the present invention will be described with reference to accompanying drawings. Firstly, a configuration of an internal combustion engine in which the following example is used will be described with reference to FIG. 1 as a premise of the present invention. FIG. 1 shows an example of an internal combustion engine adopting various configurations, the effects of the present invention remain the same even when the disposition and configuration of described auxiliary machinery and so on change, undescribed auxiliary machines are connected, or the described auxiliary machines are not used, and the effects of the present invention remain the same whether the internal combustion engine is a gasoline engine or a diesel engine.

Intake air from an air cleaner is supercharged by a supercharger 103 after the humidity of the intake air is measured by a first humidity sensor 102. Intake air 104 from the supercharger is often cooled by an intercooler 105 because the intake air has a high temperature by being compressed. Then, an intake manifold 107 distributing the air to each cylinder is filled with the air after the air passes through a throttle valve 106 controlling the output of the engine, and the humidity of that place is measured by a second humidity sensor 108. Then, the air is suctioned into a combustion chamber 113 through an intake valve, the air is mixed with a fuel injected from an injector 109, ignition is performed by an ignition plug 117, and combustion is performed. Then, the air becomes exhaust gas 110 from an exhaust valve and the supercharger 103 is driven. Subsequently, it is controlled by a catalyst 111 and discharged to the atmosphere through a muffler 112.

Combustion gas components also include moisture although blowby gas 115 as combustion gas or unburned gas leaking from a piston ring to a crankcase side due to a combustion pressure is reused for combustion after returning to the upstream near the supercharger 103 in the case of the engine equipped with the supercharger 103 and the upstream near the throttle valve 106 in the case of an engine equipped with no supercharger because it cannot be released to the atmosphere due to exhaust gas regulations. Measurement and control in the internal combustion engine as a whole are performed by an engine control unit 114.

The internal combustion engine obtains power by the ignition being performed after the air is suctioned and mixed with the fuel. Accordingly, the performance of the internal combustion engine and the characteristics of the exhaust gas are changed by the moisture in the atmosphere. In an engine using exhaust gas recirculation (EGR), in addition, the moisture contained in exhaust gas and resulting from combustion is also suctioned into the engine, and thus an increase in EGR reflux amount leads to problems such as misfiring resulting from unstable combustion and condensation in an intake air path. In practical use in this regard is a technique for installing a humidity sensor on an intake passage and using it for engine control.

During the engine control, a mixing ratio SH showing the absolute mass of the moisture in the air is used instead of the relative humidity that is used for weather forecast and so on. The mass of the moisture that is suctioned into the combustion chamber of the engine can be obtained by the mixing ratio being multiplied by an intake pipe pressure.

Figure 2:
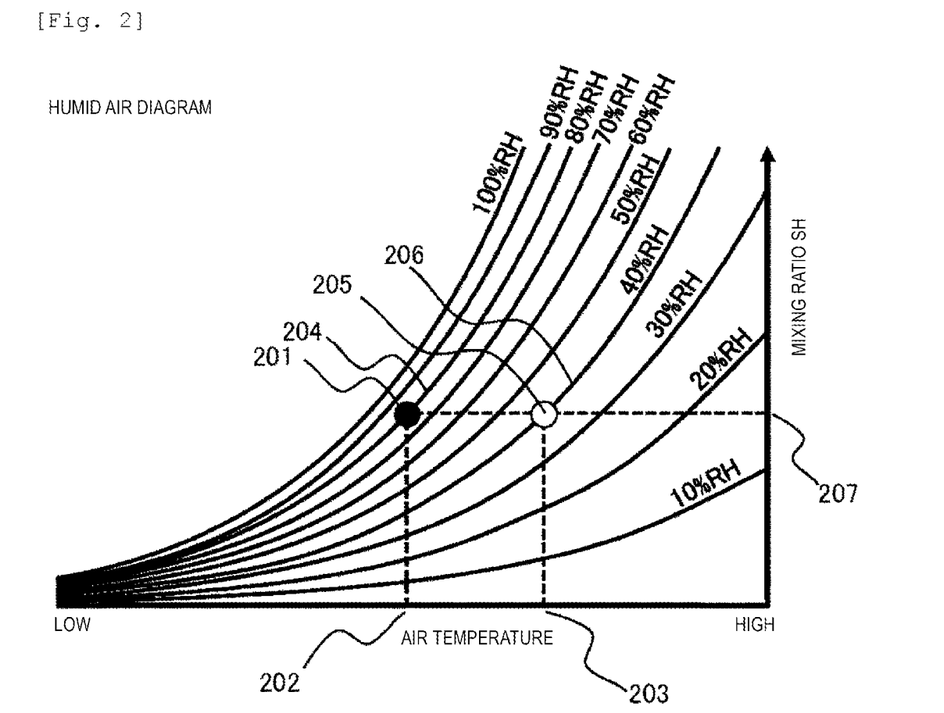
FIG. 2 is a diagram illustrating a relationship among a relative humidity, a temperature, and a mixing ratio.

The relationship between the relative humidity and the mixing ratio will be described with reference to the humid air diagram that is illustrated in FIG. 2.

As shown in the following Equation (1), the relative humidity RH shows, in the form of a percentage, the ratio of a saturated water vapor pressure $p_{sat.}$ determined simply by an air temperature to the water vapor pressure of the mixed gas at that time, that is, an air pressure p. Even at the same mass of the moisture in the air, the saturated water vapor pressure $p_{sat.}$ changes when the temperature of the air changes, and then the relative humidity RH changes. The relative humidity RH also changes when the air pressure p changes.

The mixing ratio is obtained by the mass of the moisture contained in the air being divided by the mass of dry air and the mixing ratio shows the absolute amount of the moisture in the form of mass, and thus the mixing ratio does not change even when the temperature of the air that is an object changes. Given a temperature 202 and air 201 in the state of a relative humidity 204, for example, the mixing ratio at that time is 207. The temperature becomes 203 once the air 201 is heated and turned into 205, and then the relative humidity changes into 206 although the mixing ratio 207 remains as it is. The temperature, relative humidity, mixing ratio, and pressure are interrelated as described above, and any one of the four can be obtained by calculation once the other three are determined.

Accordingly, the mixing ratio can be obtained by calculation once the relative humidity, the temperature of the air, and pressure are known. The equations are as follows. The following Equation (1) shows the relationship between the relative humidity and the pressure, and the following Equation (2) is to obtain the mixing ratio SH from the relative humidity and the temperature.

[Equation 1]

$$\text{Relative humidity } RH = \frac{p}{p_{sat.}} \cdot 100 [\%] \quad (1)$$

RH Relative humidity [% RH]
Water vapor pressure of mixed air=air pressure [hpa]
$p_{sat.}$ Saturated water vapor pressure of mixed air at that temperature [hpa]

[Equation 2]

$$\text{Mixing ratio } SH = 622 \cdot \frac{\alpha \cdot \frac{RH}{100\%} \cdot \exp\left(\frac{\beta \cdot t}{\lambda + t}\right)}{p - \alpha \frac{RH}{100\%} \cdot \exp\left(\frac{\beta \cdot t}{\lambda + t}\right)} \quad (2)$$

SH Mixing ratio [g/kg-DA]
RH Relative humidity [% RH]
t Air temperature [° C.]
p Air pressure [hpa]
α Parameter in Expression of Magnus: 6.1112 [hpa]
β Parameter in Expression of Magnus: 17.62
λ Parameter in Expression of Magnus: 243.12 [° C.]

A configuration of the humidity sensor will be described below with reference to FIGS. 3 to 8.

Figure 3A:
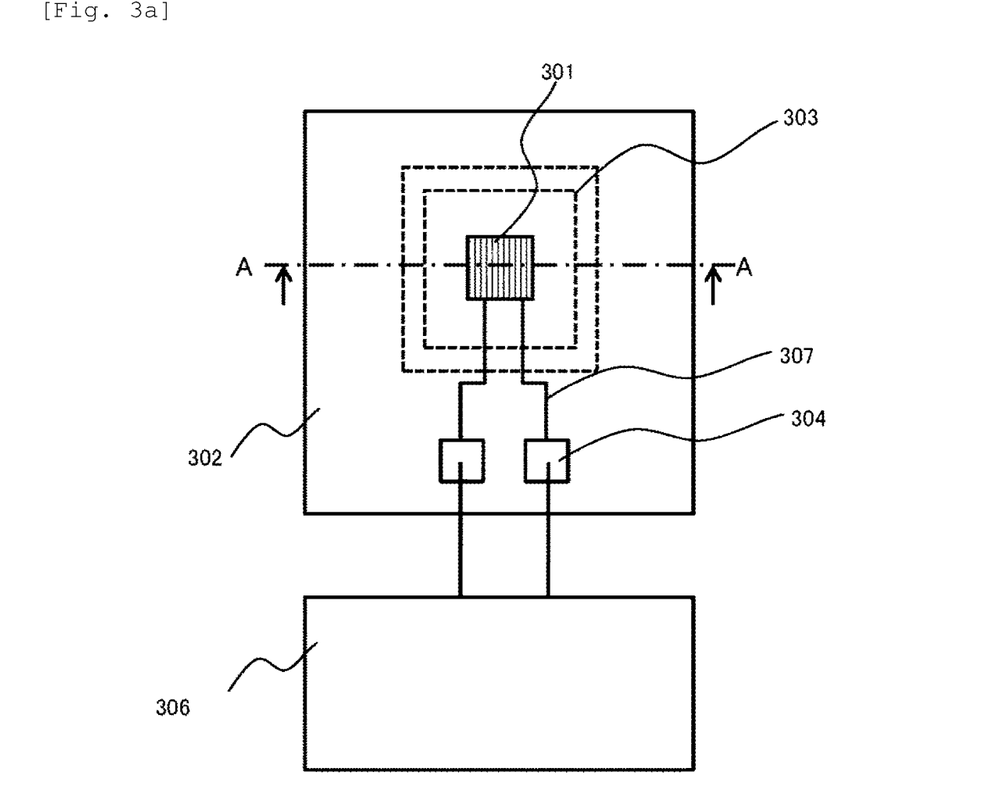
Fig.3a shows an overview of the thermal humidity sensor.
Figure 3B:
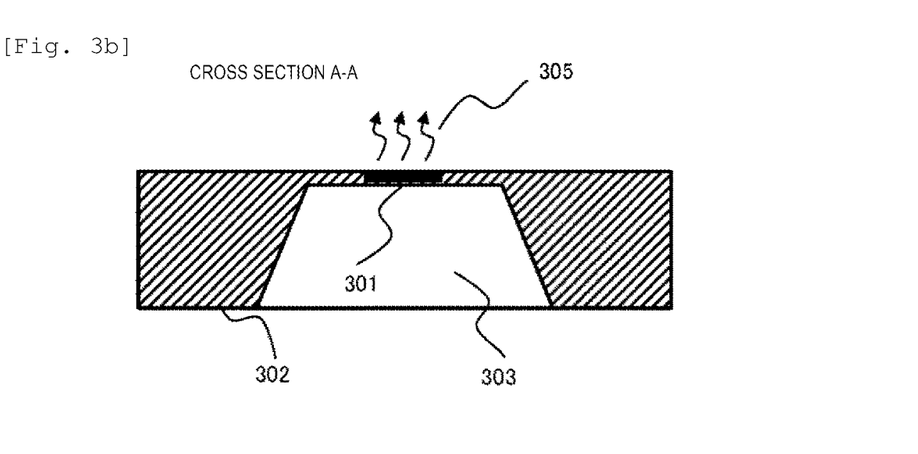
Fig. 3b is a cross section taken along line A-A of Fig. 3a FIG. 4 is a diagram illustrating a circuit of a thermal absolute humidity.

FIG. 3 is a diagram illustrating the configuration of the thermal absolute humidity sensor, FIG. 3a shows an overview of the thermal humidity sensor, and FIG. 3b is a cross section taken along line A-A of FIG. 3a. A heating heater 301 is formed on a surface of a substrate 302, a cavity 303 is formed in a back surface by etching or the like, and the resistor heater 301 is formed on a thin film. The heater is connected to a pad 304 through a wiring pattern 307 and connected to a sensor circuit 306.

The current that flows through the heater depends on a heat radiation amount 305 once the thin film heater configured as described above is heated to a certain temperature and the temperature is kept constant by the sensor circuit. This is because the heater formed on the thin film is almost insulated thermally from the substrate and little heat escapes to the substrate. Once the heater reaches a temperature within a certain range and put in a space with no air flow, the amount of heat radiation to the air indicates the mixing ratio. Accordingly, the mixing ratio can be directly measured once the heating current of the heater 301 is measured.

Figure 4:
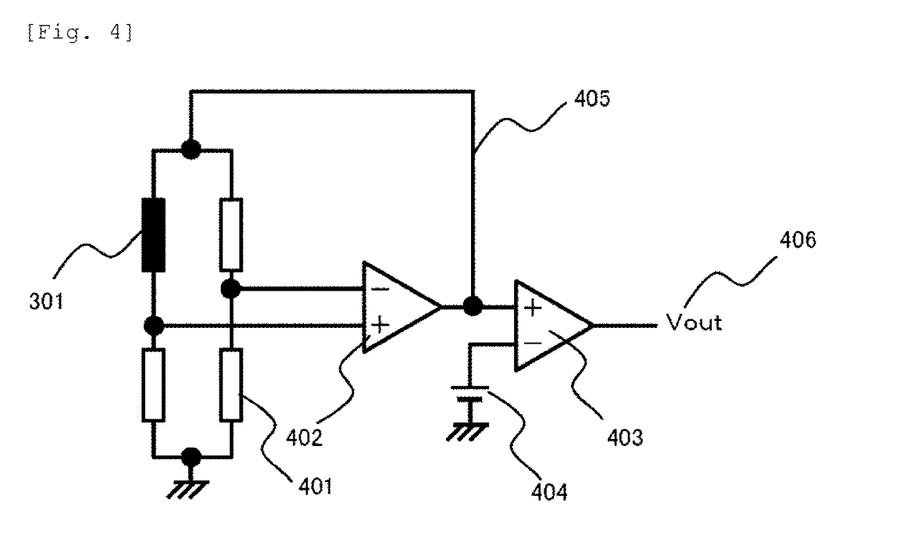
Figure 5:
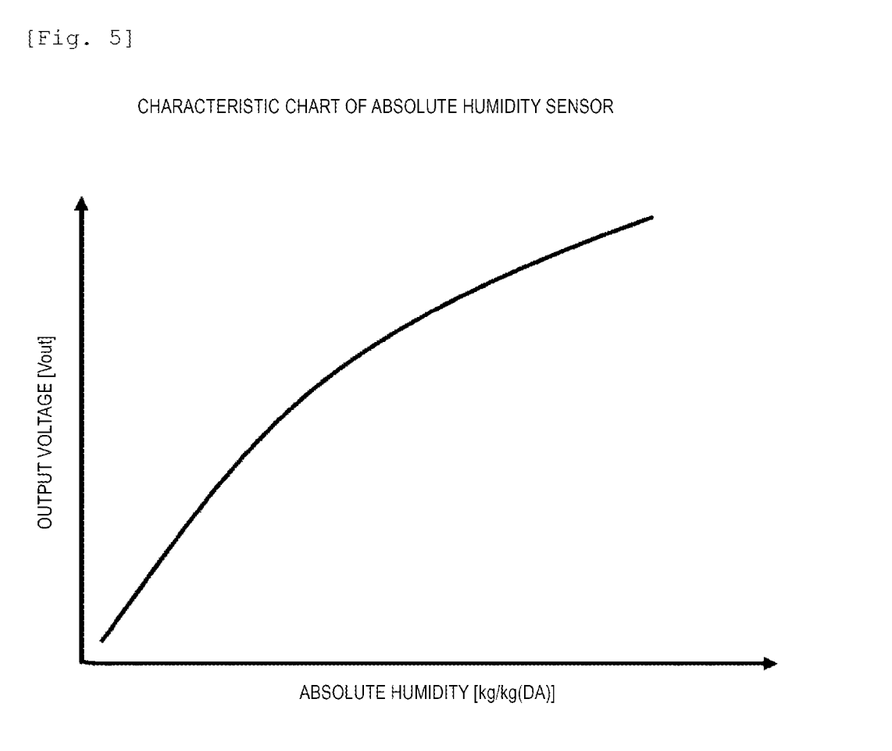
FIG. 5 is a diagram illustrating the characteristics of the thermal absolute humidity sensor.

FIG. 4 shows an overview of a drive circuit of the thermal humidity sensor.

The heater 301 is configured as a part of a Wheatstone bridge. On the circuit, an OP amplifier 402 functioning as a resistor keeping a constant temperature resistance change rate (TCR) functions as a differential amplifier and performs feedback control on a current supply circuit 405 to balance with a temperature adjustment resistance 401.

The voltage of the circuit 405 is almost equal to the current value to the heater, and thus the voltage of the circuit 405 portion indicates the amount of heat radiation to the air. An output voltage 406 becomes a voltage in accordance with the heat radiation amount of the heater 301 to the air, that is, the mixing ratio by the voltage being offset-adjusted by a voltage source 404 and amplified by an OP amplifier 403. The mixing ratio can be directly measured as a result, and this is also measurement of the moisture in the air without depending on the air temperature as in the sensor characteristics illustrated in FIG. 5. In addition, the high temperature and high humidity region tends to reach a higher accuracy than the region that has a low temperature and a low humidity at all times although the mixing ratio can be measured with high responsiveness as the heat radiation to the substrate is extremely small.

Hereinafter, an overview of a capacitive relative humidity sensor will be described with reference to FIG. 6. Although the relative humidity sensor shown in this example is a semiconductor chip-type relative humidity sensor, the effects of the present invention remain the same even when another type of relative humidity sensor using capacitance is used.

Figure 6A:
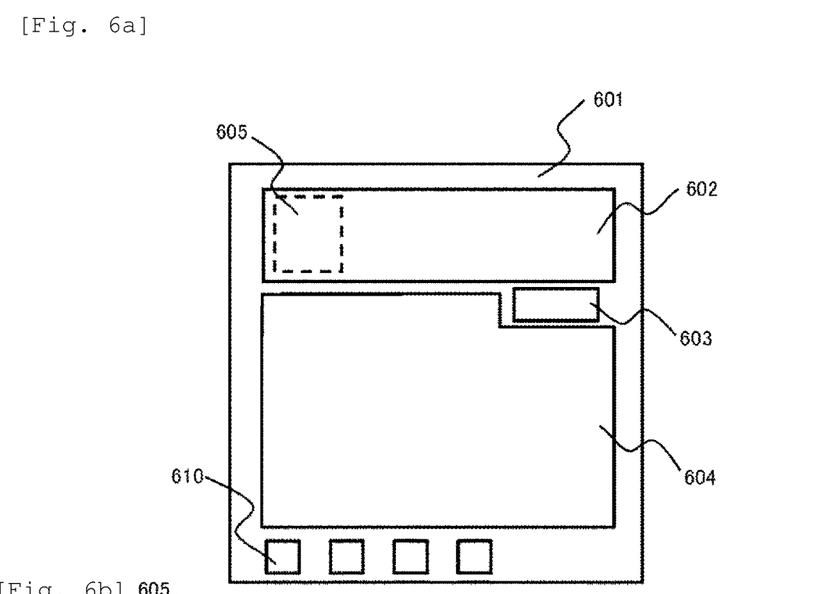

As illustrated in FIG. 6a, a comb-shaped electrode portion 602 is disposed on a semiconductor substrate 601, a temperature sensor 603 is disposed nearby, a circuit portion 604 performing signal measurement and signal output of both is disposed, and electric power supply and signal output are performed based on connection to the outside by an electrode 610. Although the sign 605 in FIG. 6b indicates a part of the comb-shaped electrode portion, the multiple comb-shaped electrodes at the part are alternately disposed in close proximity in a state where a +electrode 607 and a –electrode 606 are insulated.

Figure 6B:
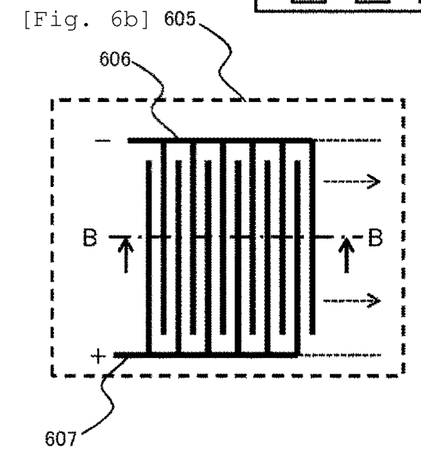
Figure 6C:
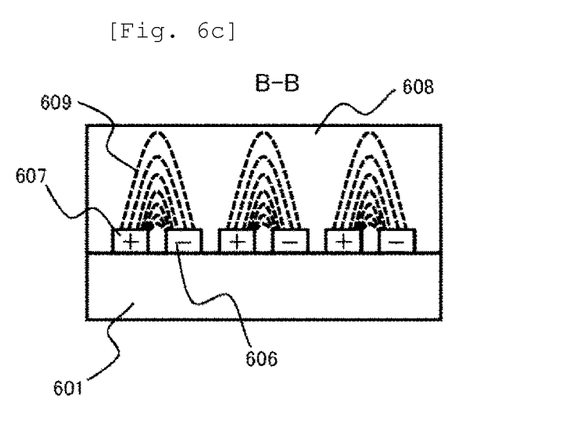
Fig. 6c is a cross section taken along line B-B of Fig. 66 of the comb-shaped electrode.

A cross section of the comb-shaped electrode is illustrated in FIG. 6c, which is a cross section taken along line B-B of FIG. 6b. The comb-shaped electrodes indicated by signs 606 and 607 are installed on a surface of the semiconductor substrate 601, and a polymer 608 is applied to the electrode surfaces thereof. The surface of the polymer 608 that is on the side opposite to the electrode 606 and electrode 607 side is exposed to the atmosphere. In general, polyimide is used as the polymer. 609 schematically illustrates an electric line of force in the polymer.

The relative dielectric constant of the polyimide is approximately 3.5, and capacitance in accordance with the relative dielectric constant of the polyimide is between the electrode 606 and the electrode 607. The polyimide has relatively high hygroscopicity, and its moisture absorption rate is correlated with the relative humidity. The relative dielectric constant of water, that is, water vapor is 80.4 (in the case of 20° C.) and larger than the relative dielectric constant of the polyimide, and thus the average relative dielectric constant in the polyimide changes in accordance with the relative humidity and the capacitance between the electrode 606 and the electrode 607 increases. In other words, the relative humidity can be found out once the capacitance between the electrodes in the above-described configuration is measured.

The temperature sensor 603 is disposed at a part very close to the comb-shaped electrode portion 602 and measures the temperatures of the comb-shaped electrodes 606, 607 and the polymer 608 rather than the temperature of the air. A band gap-type temperature sensor is exclusively used in the semiconductor chip-type relative humidity sensor. The relative humidity sensor can be configured once the relative humidity is measured by the circuit portion 604 from the capacitance of the comb-shaped electrodes 606, 607 and the temperature is measured by the temperature sensor 603, various corrections and so on are performed by the circuit portion 604, and then a measurement signal is output from the electrode 610.

Figure 7A:
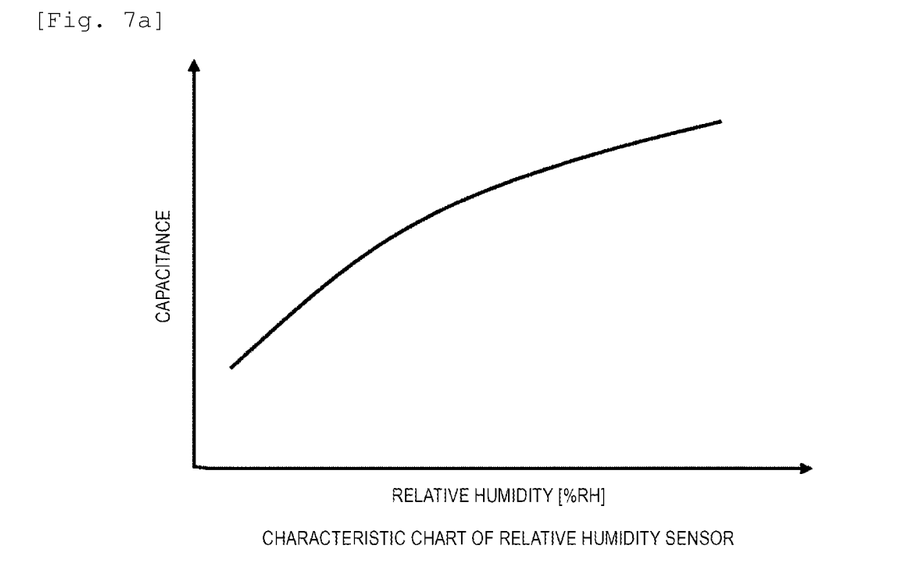
Fig. 7a is a characteristic chart of the relative humidity sensor.
Figure 7B:
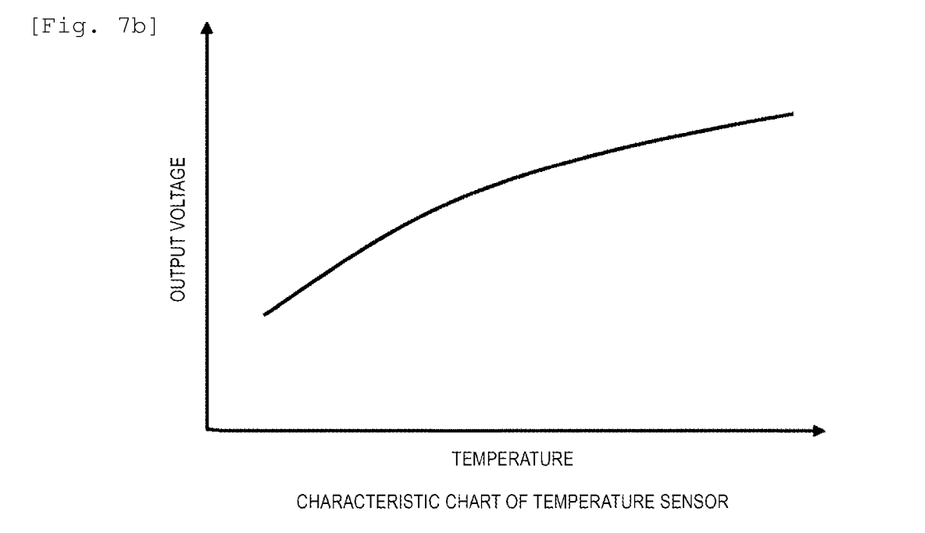
Fig. 7bis a characteristic chart of the temperature sensor.

FIG. 7 shows the characteristics of a general relative humidity sensor and a temperature sensor disposed at substantially the same place. FIG. 7a is a characteristic chart of the relative humidity sensor, and FIG. 7b is a characteristic chart of the temperature sensor. The capacitive humidity sensor measures the relative humidity. Accordingly, even in a low temperature region where the air has a small saturated water vapor amount, the capacitive humidity sensor measures a change in relative humidity when the relative humidity changes. Therefore, high accuracy and inexpensiveness are achieved in the small-mixing ratio region at or below a normal temperature.

Figure 8:
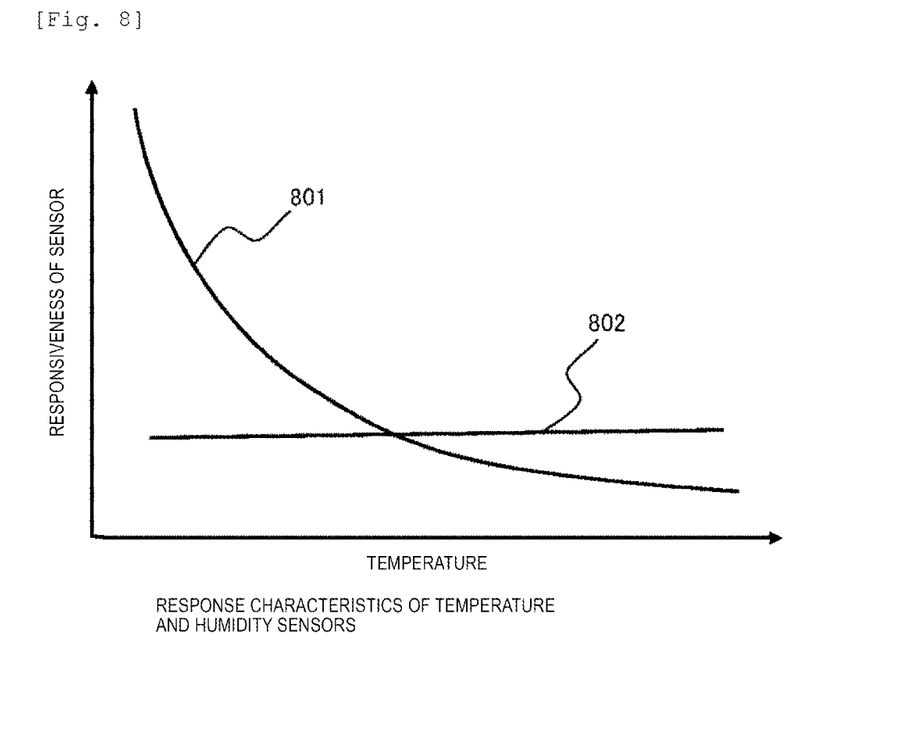
FIG. 8 is a diagram illustrating the response characteristics of the capacitive relative humidity sensor and the temperature sensor thereof.

FIG. 8 shows the response characteristics of the relative humidity sensor. The relative humidity sensor measures the relative humidity by using the hygroscopicity of the polyimide, and thus the hygroscopic responsiveness of the polyimide is the main responsiveness of the relative humidity sensor. A characteristic 801 indicates the responsiveness of the relative humidity sensor. The responsiveness is significantly changed by the temperature. The response slows down as the temperature falls, and the response becomes faster as the temperature rises. The responsiveness of the temperature sensor 603 rarely varies with the temperature. Although the mixing ratio SH is obtained from the equation illustrated in FIG. 2 in a case where the relative humidity sensor is used for the engine control, the relative humidity RH and an air temperature t used in this case are a pair and each of the values should be free from time shift and response delay for accurate calculation of the mixing ratio SH.

However, the response characteristic 801 of the relative humidity sensor and the response characteristic 802 of the temperature sensor differ from each other as illustrated in FIG. 8, and thus, in a transient state where the relative humidity RH changes, the measurement of the relative humidity RH is delayed or becomes faster than the response of the temperature sensor depending on the temperature of the air at that time. This state is a state where the relative humidity RH and the air temperature t do not make a pair and results in a problem by hindering the accurate measurement of the mixing ratio SH. Accordingly, it is not suitable for humidity measurement at a part where the relative humidity RH shows a steep change.

The characteristics vary with the type of the humidity sensor as described above, and the type of the sensor and its attachment place matter in effectively utilizing the information of the humidity sensor during the engine control. The related art gives no tip about how the effectiveness of engine control can be enhanced depending on the types of humidity sensors, the places where the sensors are disposed, and the places where the sensors are attached in a case where the plurality of humidity sensors is attached to an internal combustion engine.

Hereinafter, measurement accuracy in a case where the humidity sensor is attached to an internal combustion engine, especially an internal combustion engine for a vehicle, will be described with reference to FIG. 9.

Figure 9A:
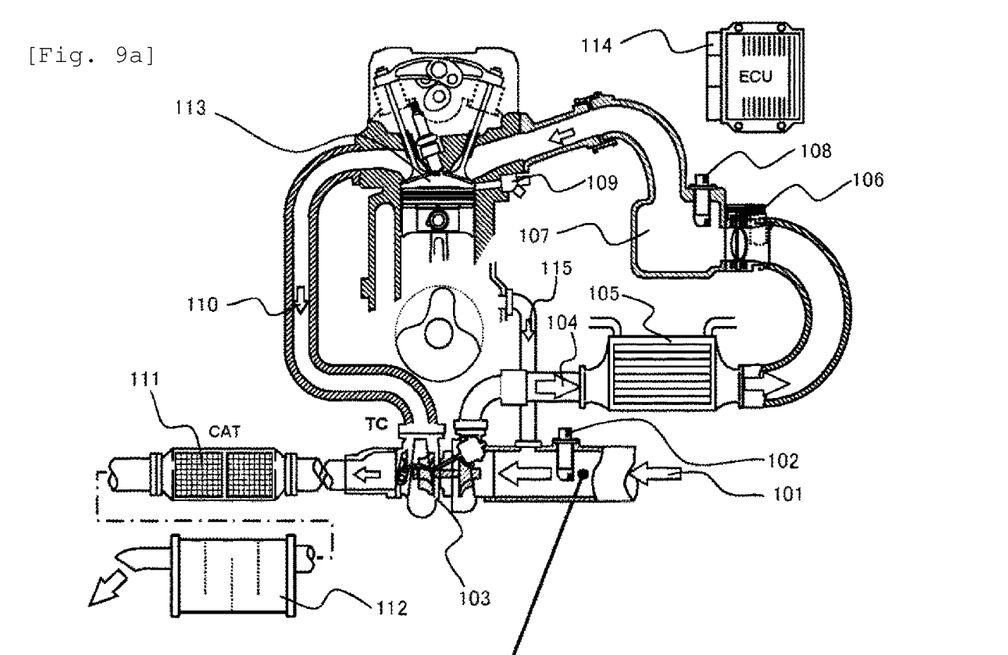
Fig. 9a is a diagram illustrating a configuration of an internal combustion engine from Fig. 1

FIG. 9 shows a relative humidity 901 and a temperature 902 measured by the temperature sensor 603 illustrated in FIG. 6 at a time when the internal combustion engine illustrated in FIG. 1 is mounted in the vehicle, the first humidity sensor 102 is a capacitive relative humidity sensor, and the vehicle travels. In addition, FIG. 9 shows a moisture amount 903 (obtained by the mixing ratio SH being multiplied by the air pressure) obtained from the relative humidity 901 and the temperature 902 by FIG. 2 being used.

Figure 9B:
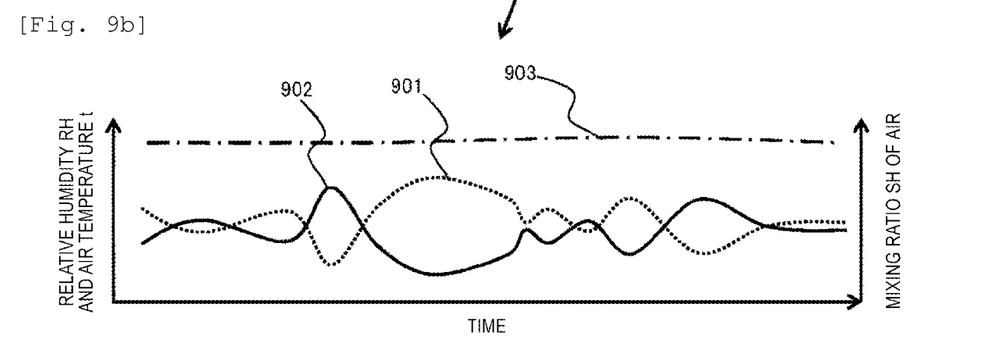
Fig. 9b is a graph displaying the relative humidity and temperature of Fig. 2.

The intake air at a time when the vehicle travels on a road or the like is taken in from 101 through an air filter and it is outside air. As illustrated in the graph that is illustrated in FIG. 9b, both the temperature and relative humidity of the outside air during the traveling are affected by weather conditions and the temperature of the engine compartment of the vehicle and change every second.

However, the moisture amount 903 obtained from the temperature and humidity depends on the weather conditions around the place of the traveling of the vehicle, and thus rarely changes during the traveling. This shows that a change in the relative humidity at a time when the intake air 101 during the traveling is measured by the first humidity sensor 102 is mainly attributable to a change in the temperature of the intake air 101 depending on the temperature of a pipe and a sensor body and is a movement contradictory to a movement of the temperature t. In addition, a change in the relative humidity RH at this time rarely exceeds the response of the sensor as well, and thus relative humidity sensor-based measurement of the air 101 passing through the air filter makes sense in terms of obtained measurement accuracy as well.

Figure 10A:
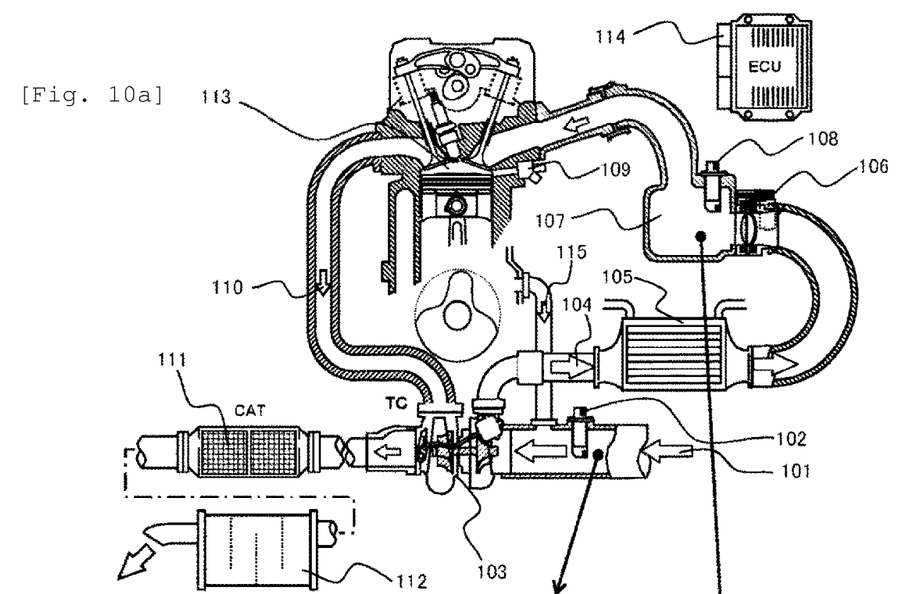
Fig. 10a is a diagram illustrating a configuration of an internal combustion engine from Fig. 1
Figure 10B:
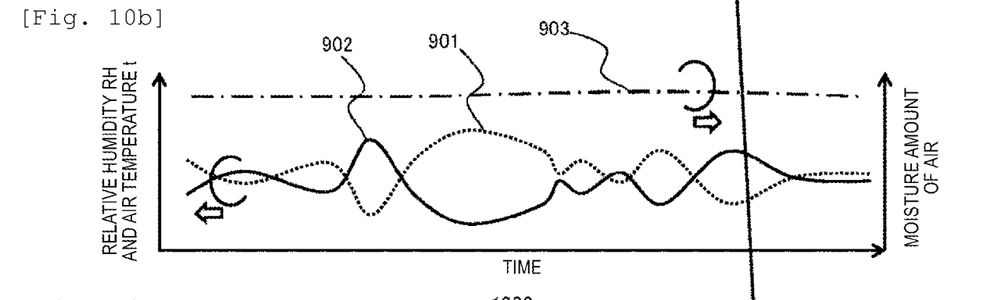
Fig. 10b is a graph displaying the relative humidity and temperature of Fig. 2.
Figure 10C:
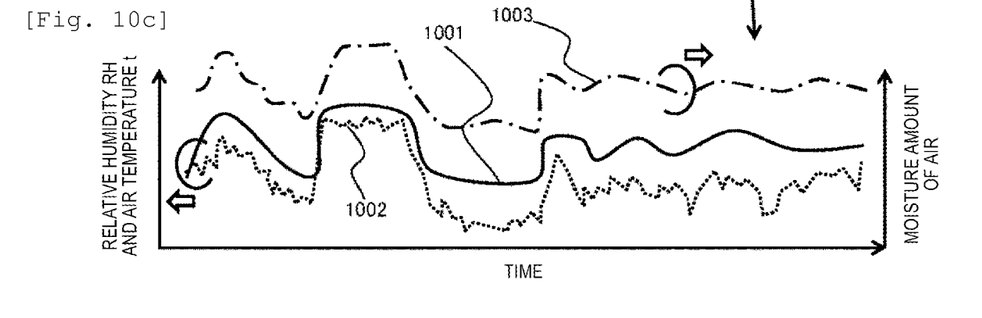
Fig. 10c is a graph displaying the change in air temperature and humidity as measured in the intake manifold by the second humidity sensor.

However, when the relative humidity is measured in the intake manifold 107 to which the second humidity sensor 108 illustrated in FIG. 10 is attached, both an air temperature 1001 and a relative humidity 1002 suddenly change as illustrated in FIG. 10c as a result of a rise in supercharging pressure attributable to the supercharger 103 and the operation of the throttle valve 106, and thus no sensor signal is capable of responding to the actual temperature and humidity alike. Accordingly, a mixing ratio 1003 obtained therefrom shows a significant fluctuation and a significant error occurs. It is a matter of course that no accurate engine control can be performed in this state. An example to address this problem is as follows.

FIRST EXAMPLE

Figure 11:
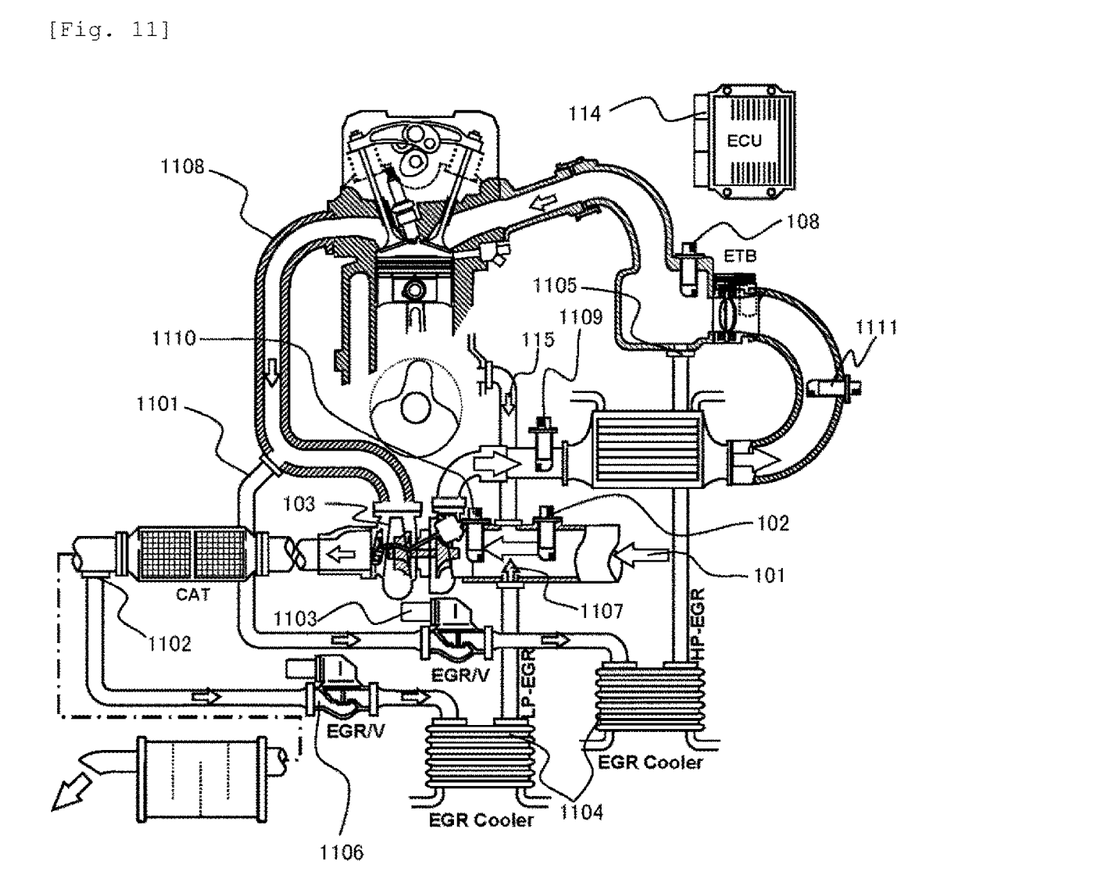
FIG. 11 is a diagram illustrating a configuration of an internal combustion engine provided with an ECR system.

In the example that is illustrated in FIG. 11, the first humidity sensor 102 is disposed downstream of the air filter and upstream of the supercharger 103 and the capacitive relative humidity sensor is used. This is because the air in that place is almost close to the atmospheric environment and no high temperature and humidity responsiveness can be obtained, and thus the use of the inexpensive humidity sensor with relatively high accuracy leads to higher control accuracy and allows inexpensive vehicle manufacturing.

However, the blowby gas 115 is merged immediately downstream of the first humidity sensor, and thus the moisture contained in the combustion gas is merged. The amount of this moisture depends on the amount of leakage of the combustion gas, and the amount of leakage of the combustion gas is suddenly changed by an engine load. Accordingly, for the reason described above, the mixing ratio SH is not accurately obtained by the relative humidity sensor at the Position where the blowby gas 115 is downstream of the confluence point.

In order to address this problem, an absolute humidity sensor is used as the second humidity sensor 108 disposed downstream of the first humidity sensor 102. Since the mixing ratio SH can be directly measured, the amount of the moisture that is suctioned by the engine can be accurately measured without being affected by a sudden change in the relative humidity RH. As a result, the mixing ratio SH obtained from the first humidity sensor and the mixing ratio SH measured by the second humidity sensor can be compared to each other and used for EGR control and diagnosis by the humidity sensors and so on can be accurately performed. Eventually, engine control can be performed properly.

Although the second humidity sensor 108 is positioned downstream of the throttle valve 106 in this example, it may also be 1111 between the throttle valve 106 and the intercooler 105, 1109 between the supercharger 103 and the intercooler 105, or 1110 between the first humidity sensor 102 and the supercharger 103. In addition, the effects of the present invention can be enhanced insofar as the second humidity sensor is a thermal absolute humidity sensor because the responsiveness is sufficiently high in that case.

The same as the above description applies to an engine that is provided with an EGR system for an exhaust gas countermeasure and fuel economy improvement. The EGR is to achieve, for example, nitrogen oxide reduction based on pump combustion temperature reduction, knocking suppression, and fuel economy improvement based on pump loss reduction in the case of a gasoline engine by returning exhaust gas to an intake side and causing the exhaust gas to be re-suctioned into the engine. This EGR is broadly divided into two types of methods based on exhaust gas introduction and mixing path differences.

A HP-EGR that takes out exhaust gas while maintaining its high pressure will be described first. A first outlet 1101 is disposed at an exhaust manifold 1108 between the engine body and the supercharger 103, the exhaust gas is collected therefrom, the flow rate of the exhaust gas is adjusted by an EGR valve 1103 for the HP-EGR, and cooling is performed by an EGR cooler 1104. Then, merging with intake air is performed from a confluence portion 1105 on an intake manifold.

Another method for EGR is LP-EGR, by which exhaust gas is collected from a low pressure exhaust portion where the exhaust gas passes through the supercharger 103. As is the case with the HP-EGR, the flow rate is adjusted by an EGR valve 1106 for the LP-EGR from a low pressure exhaust outlet 1102 and cooling is performed by the EGR cooler 1104. Then, merging with intake air is performed from a confluence portion 1107 upstream of the supercharger 103 and downstream of the first humidity sensor. Mixing of the exhaust gas upstream of the supercharger is because the pressure of the exhaust gas is low and thus merging with the high pressure intake part after the supercharging is impossible.

The HP-EGR and the LP-EGR are for the same purpose, and simply one or both EGR systems are provided in accordance with the exhaust gas reflux amount and controllability needed for the engine. In addition, the EGR cooler 1104 is optional and the order with respect to the EGR valves 1103, 1106 may also be changed.

In any of the cases described above, the moisture contained in the exhaust gas is added to the moisture at the first humidity sensor 102 part after the EGR mixing. In other words, the mixing ratio SH that is measured by the second humidity sensor 108, which is an absolute humidity sensor, is a measurement of the moistures of both the atmosphere and the EGR gas. The amount of the moisture contained in the exhaust gas is the sum of the reaction moisture of the hydrocarbon component in the fuel and the oxygen in the air by the combustion with the moisture originally contained in the atmosphere. Usually, in an internal combustion engine, the reaction moisture is indirectly managed by air-fuel ratio control during combustion, and thus the ratio of EGR reflux can be found out when the mixing ratio SH obtained from the air temperature t and the relative humidity RH of the first humidity sensor is subtracted from the mixing ratio SH measured by the second humidity sensor.

SECOND EXAMPLE

The above description is an example regarding the disposition of a plurality of humidity sensors and the types thereof. In a case where the information of the plurality of humidity sensors is used for control of the EGR and so on, however, calculation or measurement of the same mixing ratio from respective sensor outputs should be possible at all times when the first humidity sensor and the second humidity sensor are in the same environment. To this end, one of the humidity sensors needs to be adjusted based on the signal of the other humidity sensor, and this adjustment should be performed in a state where there is no disturbance as a change in moisture amount.

As described above, the humidity sensors differ from each other in responsiveness as a relative humidity sensor and an absolute humidity sensor. Accordingly, for the adjustment to be accurately performed, the mixing ratio SH should be obtained from the air temperature t by the use of the equation in FIG. 2 and the relative humidity RH should be obtained based on the relative humidity sensor side, that is, the side of the first humidity sensor that is slow in response, measures simply the humidity of the atmosphere, and is likely to have high accuracy, and the mixing ratio SH should be adjusted with respect to the absolute humidity sensor, that is, the second humidity sensor installed downstream. Then, the adjustment can be performed with accuracy and stability.

THIRD EXAMPLE

This example is to further enhance the stability of the adjustment.

The adjustment assumes that the air flowing through the first humidity sensor 102 is merged with the moisture other than the atmosphere or reaches the second humidity sensor, and thus the adjustment is not always performed and a determination needs to be made on whether or not to perform the adjustment. A stable engine state also matters in this determination, and the determination on whether or not to perform the adjustment is made based on the following information for the indication thereof and thresholds thereof. Specifically, the information and thresholds include, for example, the ranges of the temperature and humidity of the humidity sensor, the pressure at the sensor part, the timing of the intake or exhaust valve, the load or rotation speed of the internal combustion engine, the speed of the vehicle, the starting temperature of the internal combustion engine, the altitude, weather information, the temperature change rate of the atmosphere or mixed gas, the period of time after the starting of the internal combustion engine, and the temperature of the EGR gas.

Figure 12:
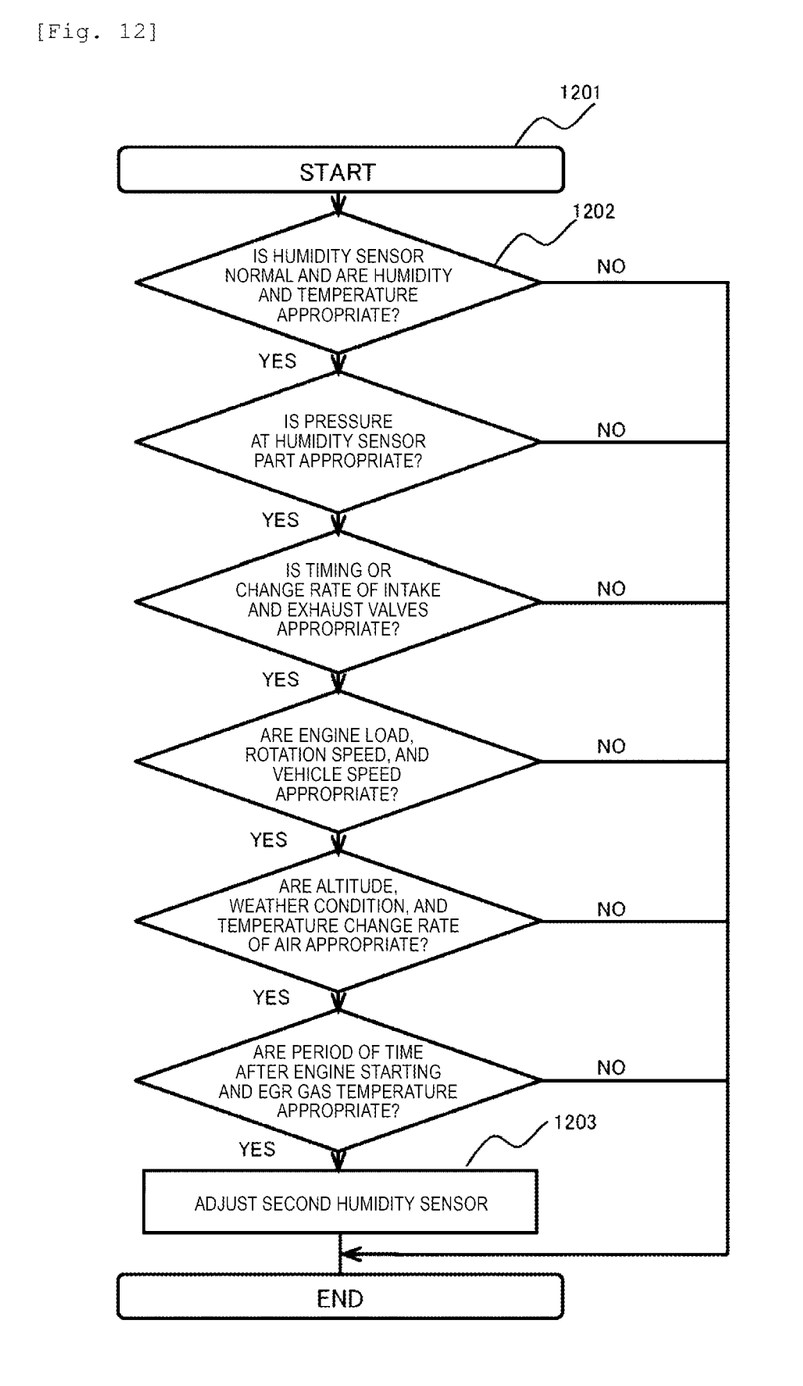
FIG. 12 is a flowchart in a case where humidity sensor adjustment is performed.

A flowchart of the above is illustrated in FIG. 12. The appropriate in FIG. 12 shows both a magnitude relationship with respect to a single threshold making the determination and being within the ranges of a plurality of thresholds. In addition, the order of the determination and the individual values are arbitrary. The stability of the sensor adjustment can be enhanced when whether or not to perform the humidity sensor adjustment is determined based on the state of the other auxiliary machinery and the operation condition of the engine.

Although an embodiment of the present invention has been described in detail above, the present invention is not limited to the embodiment described above and can be diversely modified in design within the scope of the present invention described in the claims. For example, the embodiment described above is a detailed description for facilitating the understanding of the present invention and is not necessarily limited to being provided with the entire configuration described above. In addition, some of the configuration of an embodiment may be replaced with the configuration of another embodiment, and the configuration of another embodiment may be added to the configuration of the embodiment. Furthermore, the other configuration may be added to, removed from, or replaced with some of the configuration of each embodiment.

REFERENCE SIGNS LIST

101 Air filter downstream air
102 First humidity sensor
108 Second humidity sensor
301 Heater
406 Output of thermal absolute humidity sensor
602 Comb-shaped electrode portion
603 Temperature sensor
609 Electric line of force
801 Response characteristic of relative humidity sensor
802 Response characteristic of temperature sensor
901 Relative humidity during vehicle traveling
902 Temperature during vehicle traveling 903 Mixing ratio during vehicle traveling
1001 Relative humidity at second humidity sensor attachment position
1002 Temperature at second humidity sensor attachment position
1003 Mixing ratio at second humidity sensor attachment position
1105 Confluence point of HP-EGR
1107 Confluence point of LP-EGR

The invention claimed is:

1. A control device for an internal combustion engine, the control device comprising:
an absolute humidity sensor located in a middle of a flow of an intake passage of the internal combustion engine, wherein the absolute humidity sensor detects an absolute humidity of gas in the intake passage of the internal combustion engine at a first location;
a relative humidity sensor located in the middle of the flow of the intake passage of the internal combustion engine, wherein the relative humidity sensor is located upstream of the absolute humidity sensor in the flow detects a relative humidity of gas in the intake passage of the internal combustion engine at a second location;
a temperature sensor that measures of a temperature of comb-shaped electrodes and a polymer that comprise the absolute humidity sensor;
an engine control unit (ECU) that is communicatively coupled to the absolute humidity sensor, the relative humidity sensor and the temperature sensor,
wherein the ECU is configured to:
calculate a first mixing ratio based on the relative humidity detected by the relative humidity sensor,
calculate a second mixing ratio based on the temperature measured by the temperature sensor and the absolute humidity detected by the absolute humidity sensor, and
control the internal combustion engine based on the first mixing ratio and second mixing ratio.

2. The control device according to claim 1, wherein:
the gas in the intake passage of the internal combustion engine at the second location is atmosphere suctioned by the internal combustion engine, and
the gas in the intake passage of the internal combustion engine at the first location is a mixed gas in which an exhaust gas of the internal combustion engine is mixed downstream in the flow.

3. The control device according to claim 1, wherein:
the gas in the intake passage of the internal combustion engine at the second location is atmosphere suctioned by the internal combustion engine, and
the gas in the intake passage of the internal combustion engine at the first location is a post-supercharging high pressure intake air supercharged downstream in the flow.

4. The control device according to claim 1, wherein:
the gas in the intake passage of the internal combustion engine at the second location is atmosphere suctioned by the internal combustion engine, and
the gas in the intake passage of the internal combustion engine at the first location is a high-pressure mixed gas in which an exhaust gas from the internal combustion engine is mixed downstream in the flow and supercharged further downstream in the flow.

5. The control device according to claim 1,
wherein the gas in the intake passage of the internal combustion engine at the second location is atmosphere suctioned by the internal combustion engine, and
the ECU is further configured to:
calculate an absolute humidity of the atmosphere based on the relative humidity and a temperature of the atmosphere, and
adjust the absolute humidity detected by the absolute humidity sensor based on the absolute humidity of the atmosphere calculated.

6. The control device according to claim 5, wherein the ECU further:
determines whether or not to adjust the absolute humidity detected by the absolute humidity sensor based on a state of the internal combustion engine.

7. The control device according to claim 6, wherein the ECU further:
determines whether or not to adjust absolute humidity detected by the absolute humidity sensor, based on at least one of:
temperature and humidity ranges of the relative humidity sensor,
a pressure at a sensor part,
a valve timing of an intake valve or an exhaust valve of the internal combustion engine,
a presence or absence of exhaust gas recirculation (EGR) valve malfunction,
a load or rotation speed of the internal combustion engine,
a speed of a vehicle in which the internal combustion engine is mounted,
a starting temperature of the internal combustion engine,
an altitude of a place where the vehicle is positioned,
weather information,
a temperature change rate of the gas in the intake passage of the internal combustion engine at the second location,
a period of time after starting of the internal combustion engine, and
an EGR gas temperature.

* * * * *